(12) United States Patent
Jung et al.

(10) Patent No.: US 11,885,638 B2
(45) Date of Patent: Jan. 30, 2024

(54) METHOD, SYSTEM, AND NON-TRANSITORY COMPUTER-READABLE RECORDING MEDIUM FOR GENERATING A MAP FOR A ROBOT

(71) Applicant: Bear Robotics, Inc., Redwood City, CA (US)

(72) Inventors: Yeo Jin Jung, Gongju-si (KR); Seongjun Park, Seoul (KR); Jungju Oh, Seoul (KR)

(73) Assignee: Bear Robotics, Inc., Redwood City, CA (US)

( * ) Notice: Subject to any disclaimer, the term of this patent is extended or adjusted under 35 U.S.C. 154(b) by 319 days.

(21) Appl. No.: 17/134,888

(22) Filed: Dec. 28, 2020

(65) Prior Publication Data

US 2022/0206510 A1 Jun. 30, 2022

(51) Int. Cl.
*G01C 21/00* (2006.01)
*G06V 20/58* (2022.01)
*G01C 21/20* (2006.01)
*G06V 10/44* (2022.01)
*G06T 5/00* (2006.01)
*G06T 5/30* (2006.01)

(52) U.S. Cl.
CPC ............ *G01C 21/383* (2020.08); *G06T 5/002* (2013.01); *G06T 5/30* (2013.01); *G06V 10/44* (2022.01); *G06V 20/58* (2022.01); *G01C 21/206* (2013.01)

(58) Field of Classification Search
None
See application file for complete search history.

(56) References Cited

U.S. PATENT DOCUMENTS

| | | | | |
|---|---|---|---|---|
| 9,285,227 | B1* | 3/2016 | Chao | G01C 21/3863 |
| 10,916,019 | B2* | 2/2021 | Li | G06T 5/30 |
| 11,209,277 | B2* | 12/2021 | Fakih | G01C 21/367 |
| 11,561,553 | B1* | 1/2023 | Dydek | G01S 5/16 |
| 11,684,886 | B1* | 6/2023 | Ebrahimi Afrouzi | B25J 11/0085 95/282 |
| 2019/0094876 | A1* | 3/2019 | Moore | G05D 1/024 |
| 2020/0027336 | A1* | 1/2020 | Cho | G08B 27/001 |
| 2020/0160533 | A1* | 5/2020 | Du | G06N 3/08 |
| 2020/0167993 | A1 | 5/2020 | Chen et al. | |
| 2020/0327279 | A1* | 10/2020 | Avagyan | G06V 20/58 |
| 2020/0353943 | A1* | 11/2020 | Siddiqui | G06N 3/045 |
| 2020/0394813 | A1 | 12/2020 | Theverapperuma et al. | |

(Continued)

FOREIGN PATENT DOCUMENTS

| | | |
|---|---|---|
| CN | 110703747 A | 1/2020 |
| CN | 111337941 A | 6/2020 |

(Continued)

*Primary Examiner* — Randolph I Chu
(74) *Attorney, Agent, or Firm* — Dinsmore & Shohl LLP; Yongsok Choi, Esq.

(57) ABSTRACT

According to one aspect of the invention, there is provided a method for generating a map for a robot, the method comprising the steps of: acquiring a raw map associated with a task of the robot; identifying pixels estimated to be a moving obstacle in the raw map, on the basis of at least one of colors of pixels specified in the raw map and sizes of areas associated with the pixels; and performing dilation and erosion operations on the pixels estimated to be the moving obstacle, and determining a polygon-based contour of the moving obstacle.

15 Claims, 8 Drawing Sheets

(56) References Cited

U.S. PATENT DOCUMENTS

| | | | |
|---|---|---|---|
| 2021/0109537 A1* | 4/2021 | Li | G05D 1/0221 |
| 2021/0183116 A1* | 6/2021 | Guo | G01C 21/3804 |
| 2022/0206510 A1* | 6/2022 | Jung | G05D 1/0246 |
| 2022/0237866 A1* | 7/2022 | Stein | G06V 20/56 |
| 2022/0292289 A1* | 9/2022 | Shalumov | H04N 23/698 |
| 2023/0209017 A1* | 6/2023 | Chaudhry | G06V 10/7625 |
| | | | 382/103 |
| 2023/0209040 A1* | 6/2023 | He | H04N 13/158 |
| | | | 348/36 |
| 2023/0225576 A1* | 7/2023 | Wu | A47L 9/2805 |
| | | | 701/26 |
| 2023/0230666 A1* | 7/2023 | Rosenblatt | G16H 20/10 |
| | | | 705/2 |

FOREIGN PATENT DOCUMENTS

| | | | |
|---|---|---|---|
| JP | 2007280387 A | | 10/2007 |
| JP | 2014174275 A | * | 9/2014 |
| JP | 2014174275 A | | 9/2014 |
| JP | 2014203429 A | | 10/2014 |
| JP | 2018177074 A | | 11/2018 |
| KR | 1020200085142 A | | 7/2020 |

* cited by examiner

300

METHOD, SYSTEM, AND NON-TRANSITORY COMPUTER-READABLE RECORDING MEDIUM FOR GENERATING A MAP FOR A ROBOT

FIELD OF THE INVENTION

The present invention relates to a method, system, and non-transitory computer-readable recording medium for generating a map for a robot.

BACKGROUND

Robots are utilized to replace or assist people in various fields because they can automatically perform difficult tasks or repetitive operations. Recently, various researches are being conducted on techniques for generating a map for a robot, since a map that accurately reflects information on surroundings is required in order for the robot to run smoothly.

As an example of related conventional techniques, Korean Laid-Open Patent Publication No. 10-2020-0085142 discloses a robot cleaning device that generates map data, comprising: a communication interface; a memory for storing one or more instructions; and a processor for controlling the robot cleaning device by executing the one or more instructions, wherein the processor is configured to: generate raw map data related to a cleaning space by executing the one or more instructions; generate object information on at least one object in the cleaning space; classifying areas in the raw map data into a plurality of areas on the basis of the object information; and determine identification values of the plurality of classified areas on the basis of the object information.

However, according to the techniques introduced so far as well as the above-described conventional technique, a raw map primarily generated on the basis of sensing information of a robot (e.g., information acquired by an image sensor, a laser sensor, a LIDAR sensor, etc.) or provided from an external system is used to perform a task of the robot (e.g., serving food) as it is, or used after it is manually modified (e.g., removing noises, annotating obstacle contours, etc.) When the raw map is used as it is, the map contains considerable noises, obstacle contours are inaccurate, and moving obstacles such as people are recognized as fixed obstacles such as walls and retained in the map, so that the robot often runs inefficiently. Further, when the raw map is manually modified, there is a problem that significant time, cost, and effort are required to find and remove fine noises from the raw map with the naked eye, correct blurry contours of the obstacles, and manually annotate the contour extents of the obstacles.

In this connection, the inventor(s) present a novel and inventive technique capable of quickly and accurately automating and performing processes of editing a raw map associated with a task of a robot.

SUMMARY OF THE INVENTION

One object of the present invention is to solve all the above-described problems in the prior art.

Another object of the invention is to reduce time, cost, and effort required to generate a map that is utilized to perform a task of a robot.

Yet another object of the invention is to enable a robot to run stably and efficiently by accurately removing fine noises that are difficult to detect with the naked eye.

Still another object of the invention is to set a contour of an obstacle more accurately and enable a user to easily edit the contour of the obstacle afterwards, by performing dilation and erosion operations on pixels estimated to be an obstacle, and specifying (and annotating) a polygon-based contour of the obstacle such that all accessory obstacles associated with the obstacle may be included.

The representative configurations of the invention to achieve the above objects are described below.

According to one aspect of the invention, there is provided a method for generating a map for a robot, the method comprising the steps of: acquiring a raw map associated with a task of the robot; identifying pixels estimated to be a moving obstacle in the raw map, on the basis of at least one of colors of pixels specified in the raw map and sizes of areas associated with the pixels; and performing dilation and erosion operations on the pixels estimated to be the moving obstacle, and determining a polygon-based contour of the moving obstacle.

According to another aspect of the invention, there is provided a system for generating a map for a robot, the system comprising: a raw map acquisition unit configured to acquire a raw map associated with a task of the robot; a pixel identification unit configured to identify pixels estimated to be a moving obstacle in the raw map, on the basis of at least one of colors of pixels specified in the raw map and sizes of areas associated with the pixels; and a contour determination unit configured to perform dilation and erosion operations on the pixels estimated to be the moving obstacle, and determine a polygon-based contour of the moving obstacle.

In addition, there are further provided other methods and systems to implement the invention, as well as non-transitory computer-readable recording media having stored thereon computer programs for executing the methods.

According to the invention, it is possible to reduce time, cost, and effort required to generate a map that is utilized to perform a task of a robot.

According to the invention, it is possible to enable a robot to run stably and efficiently by accurately removing fine noises that are difficult to detect with the naked eye.

According to the invention, it is possible to set a contour of an obstacle more accurately and enable a user to easily edit the contour of the obstacle afterwards, by performing dilation and erosion operations on pixels estimated to be an obstacle, and specifying (and annotating) a polygon-based contour of the obstacle such that all accessory obstacles associated with the obstacle may be included.

DETAILED DESCRIPTION OF THE INVENTION

Figure 1:
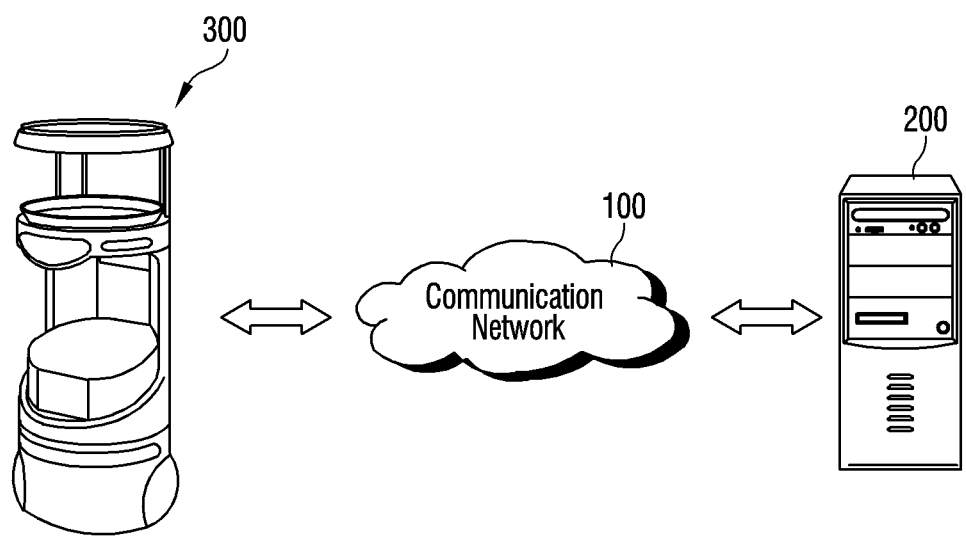
FIG. 1 schematically shows the configuration of an entire system for generating a map for a robot according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 schematically shows the configuration of the entire system for generating a map for a robot according to one embodiment of the invention.

As shown in FIG. 1, the entire system according to one embodiment of the invention may comprise a communication network 100, a map management system 200, and a robot 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as Wi-Fi communication, Wi-Fi Direct communication, Long Term Evolution (LTE) communication, Bluetooth communication (more specifically, Bluetooth Low Energy (BLE) communication), infrared communication, and ultrasonic communication.

Next, the map management system 200 according to one embodiment of the invention may communicate with the robot 300 to be described below via the communication network 100, and may function to: acquire a raw map associated with a task of the robot 300; identify pixels estimated to be a moving obstacle in the raw map, on the basis of at least one of colors of pixels specified in the raw map and sizes of areas associated with the pixels; and perform dilation and erosion operations on the pixels estimated to be the moving obstacle, and determine a polygon-based contour of the moving obstacle.

Meanwhile, although the map management system 200 has been described as above, the above description is illustrative, and it will be apparent to those skilled in the art that at least a part of the functions or components required for the map management system 200 may be implemented or included in the robot 300 to be described below or an external system (not shown), as necessary. Further, in some cases, all of the functions and components of the map management system 200 may be implemented or included in the robot 300.

Next, the robot 300 according to one embodiment of the invention is a device that may communicate with the map management system 200 via the communication network 100, and may autonomously perform predetermined functions or assigned tasks (e.g., serving food, retrieving containers, etc.) without any operation of a user. The robot 300 may include at least one of a module (e.g., a grab, a robotic arm module, etc.) for loading and unloading an object (e.g., a food tray), an imaging module (e.g., a visible light camera, an infrared camera, etc.) for acquiring images of surroundings, and a drive module (e.g., a motor) for moving the robot 300. For example, the robot 300 may have characteristics or functions similar to those of at least one of a guide robot, a transport robot, a cleaning robot, a medical robot, an entertainment robot, a pet robot, and an unmanned flying robot.

Meanwhile, according to one embodiment of the invention, the robot 300 may include an application for controlling a destination of the robot 300. The application may be downloaded from the map management system 200 or an external application distribution server (not shown).

Configuration of the Map Management System

Hereinafter, the internal configuration of the map management system 200 crucial for implementing the invention and the functions of the respective components thereof will be discussed.

Figure 2:
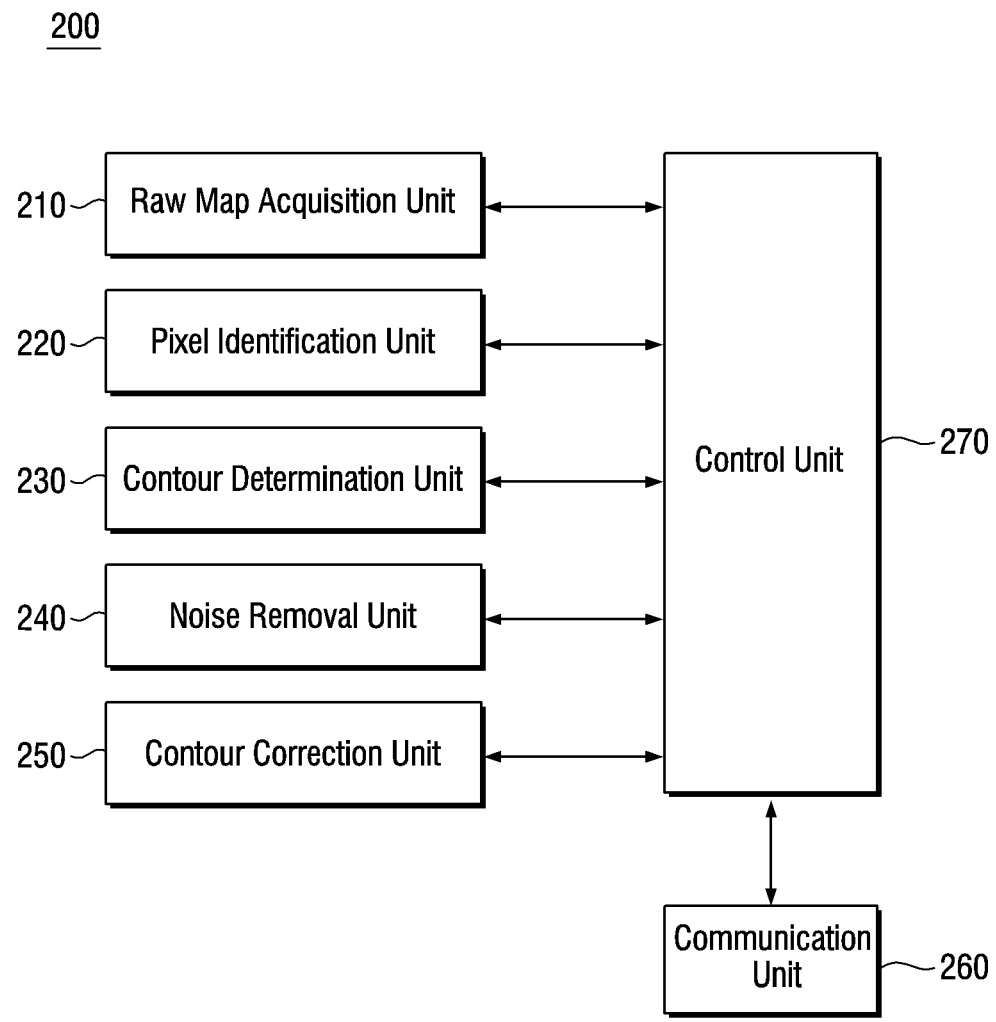
FIG. 2 illustratively shows the internal configuration of a map management system according to one embodiment of the invention.

FIG. 2 illustratively shows the internal configuration of the map management system 200 according to one embodiment of the invention.

As shown in FIG. 2, the map management system 200 according to one embodiment of the invention may comprise a raw map acquisition unit 210, a pixel identification unit 220, a contour determination unit 230, a noise removal unit 240, a contour correction unit 250, a communication unit 260, and a control unit 270. According to one embodiment of the invention, at least some of the raw map acquisition unit 210, the pixel identification unit 220, the contour determination unit 230, the noise removal unit 240, the contour correction unit 250, the communication unit 260, and the control unit 270 may be program modules that communicate with an external system. The program modules may be included in the map management system 200 in the form of operating systems, application program modules, and other program modules, while they may be physically stored in a variety of commonly known storage devices. Further, the program modules may also be stored in a remote storage device that may communicate with the map management system 200. Meanwhile, such program modules may include, but are not limited to, routines, subroutines, programs, objects, components, and data structures for performing specific tasks or executing specific abstract data types according to the invention as will be described below.

First, the raw map acquisition unit 210 according to one embodiment of the invention may function to acquire a raw map associated with a task of the robot 300. According to one embodiment of the invention, the raw map acquisition unit 210 may acquire the raw map on the basis of a sensor module (e.g., an image sensor, a radar sensor, a LIDAR sensor, etc.) that may be included in or interwork with the robot 300, or acquire the raw map from an external system. The task according to one embodiment of the invention may refer to a specific job, action, or operation assigned to the robot 300, and causing the robot 300 to move to a specific place, serve food, or retrieve containers may be assigned as the task, for example.

For example, the raw map acquisition unit 210 may generate a raw map on the basis of sensing information on at least one object (e.g., all types of entities such as people, things, etc.) disposed outside the robot 300. More specifically, the raw map acquisition unit 210 may generate a two- or three-dimensional raw map centered on the robot, on the basis of image data acquired by photographing the at least one object through an image sensor, distance data acquired by measuring the at least one object through at least one of a LIDAR sensor, a radar sensor, a laser sensor, and an ultrasonic sensor, and the like.

As another example, the raw map acquisition unit 210 may acquire a raw map associated with a task of the robot 300 from an external system associated with the raw map or another robot 300.

Next, the pixel identification unit 220 according to one embodiment of the invention may identify at least one of pixels estimated to be a moving obstacle, pixels estimated to be noises, and pixels estimated to be a fixed obstacle in the raw map, on the basis of at least one of colors of pixels specified in the raw map and sizes of areas associated with the pixels. Here, the fixed obstacle may refer to an obstacle whose movement to another place is impossible (like a building structure such as a wall) or difficult above a certain level, and the moving obstacle may refer to an obstacle whose movement to another place is easy above a certain level (like a desk, a chair, or a table).

For example, according to one embodiment of the invention, the colors of pixels specified in the raw map may be represented in a gray scale according to sensing information (specifically, intensity of sensed signals) acquired in the process of generating the raw map. According to the gray scale, the colors of pixels specified in the raw map may be largely classified into white, gray, and black. The white pixels may indicate an area where nothing is located (i.e., an empty area), the black pixels may indicate an area where a real world object is located, and the gray pixels may indicate an area where a real world object may possibly be located. In this case, when an area (e.g., a closed area) is formed by including (or connecting) gray pixels and black pixels that are adjacent to each other (e.g., contiguous or located within a certain level) among gray pixels and black pixels in the raw map, and has a size less than or equal to a first threshold size, the pixel identification unit 220 may identify the pixels in the area as the pixels estimated to be the noises. Here, the first threshold size may be predetermined or determined through probabilistic statistical analysis based on the number of areas formed by including gray pixels and black pixels that are adjacent to each other in the raw map and the extents of the areas. Further, when an area (e.g., a closed area) is formed by including (or connecting) black pixels that are adjacent to each other among black pixels in the raw map, and has a size greater than the first threshold size and less than or equal to a second threshold size, the pixel identification unit 220 may identify the pixels in the area as the pixels estimated to be the moving obstacle. Here, the second threshold size may be predetermined or determined through probabilistic statistical analysis based on the number of areas formed by including black pixels that are adjacent to each other in the raw map and the extents of the areas. Furthermore, when an area (e.g., a closed area) is formed by including (or connecting) black pixels that are adjacent to each other among black pixels in the raw map, and has a size greater than the second threshold size, the pixel identification unit 220 may identify the pixels in the area as the pixels estimated to be the fixed obstacle.

Next, the contour determination unit 230 according to one embodiment of the invention may function to perform dilation and erosion operations on the pixels estimated to be the moving obstacle by the pixel identification unit 220, and determine a polygon-based contour of the moving obstacle.

For example, the contour determination unit 230 may perform a dilation operation and then an erosion operation on the pixels estimated to be a first moving obstacle, and may group at least one second moving obstacle located within a predetermined distance from the first moving obstacle together with the first moving obstacle. Further, the contour determination unit 230 may identify convex hulls corresponding to contours of the grouped moving obstacles (i.e., the first moving obstacle and the at least one second moving obstacle) on the basis of a convex hull algorithm, and may determine the contours of the grouped moving obstacles on the basis of the identified convex hulls (e.g., by connecting the convex hulls together).

Next, the noise removal unit 240 according to one embodiment of the invention may function to remove the pixels estimated to be the noises in the raw map by the pixel identification unit 220.

For example, when the colors of pixels specified in the raw map are represented in a gray scale according to sensing information (specifically, intensity of sensed signals) acquired in the process of generating the raw map as described above, the noise removal unit 240 may remove the noises by correcting the pixels estimated to be the noises by the pixel identification unit 220 (e.g., the pixels in an area that is formed by including (or connecting) gray pixels and black pixels that are adjacent to each other among gray pixels and black pixels in the raw map, and has a size less than or equal to the first threshold size) to white pixels.

Next, the contour correction unit 250 according to one embodiment of the invention may function to correct at least one of a color and a thickness of a contour of the pixels estimated to be the fixed obstacle in the raw map by the pixel identification unit 220.

For example, when the colors of pixels specified in the raw map are represented in a gray scale according to sensing information (specifically, intensity of sensed signals) acquired in the process of generating the raw map as described above, the contour correction unit 250 may correct a contour of the pixels estimated to be the fixed obstacle by the pixel identification unit 220 (e.g., the pixels in an area that is formed by including (or connecting) black pixels that are adjacent to each other among black pixels in the raw map, and has a size greater than the second threshold size) to have black color and a thickness not less than a predetermined level.

Further, the contour correction unit 250 may dynamically determine a thickness of a contour of an area specified on the basis of the pixels estimated to be the fixed obstacle, with reference to a size of the specified area.

For example, the contour correction unit 250 may determine the contour of the specified area to be thicker as the size of the area is greater, and to be thinner as the size of the area is smaller.

Meanwhile, the contour correction unit 250 according to one embodiment of the invention may perform the correction by suppressing the pixels estimated to be the moving obstacle and selectively specifying the pixels estimated to be the fixed obstacle.

For example, the contour correction unit 250 may perform the correction after suppressing black pixels included in an area that is formed by including (or correcting) black pixels adjacent to each other among black pixels in the raw map and has a size less than or equal to the second threshold size (e.g., disabling or temporarily removing a layer associated with the black pixels included in the area), and selectively specifying only black pixels included in an area that is formed by including (or correcting) black pixels adjacent to each other among black pixels in the raw map and has a size greater than the second threshold size.

Next, according to one embodiment of the invention, the communication unit 260 may function to enable data transmission/reception from/to the raw map acquisition unit 210, the pixel identification unit 220, the contour determination unit 230, the noise removal unit 240, and the contour correction unit 250.

Lastly, according to one embodiment of the invention, the control unit 270 may function to control data flow among the raw map acquisition unit 210, the pixel identification unit 220, the contour determination unit 230, the noise removal unit 240, the contour correction unit 250, and the communication unit 260. That is, the control unit 270 according to one embodiment of the invention may control data flow into/out of the map management system 200 or data flow among the respective components of the map management system 200, such that the raw map acquisition unit 210, the pixel identification unit 220, the contour determination unit 230, the noise removal unit 240, the contour correction unit 250, and the communication unit 260 may carry out their particular functions, respectively.

Figure 3A:
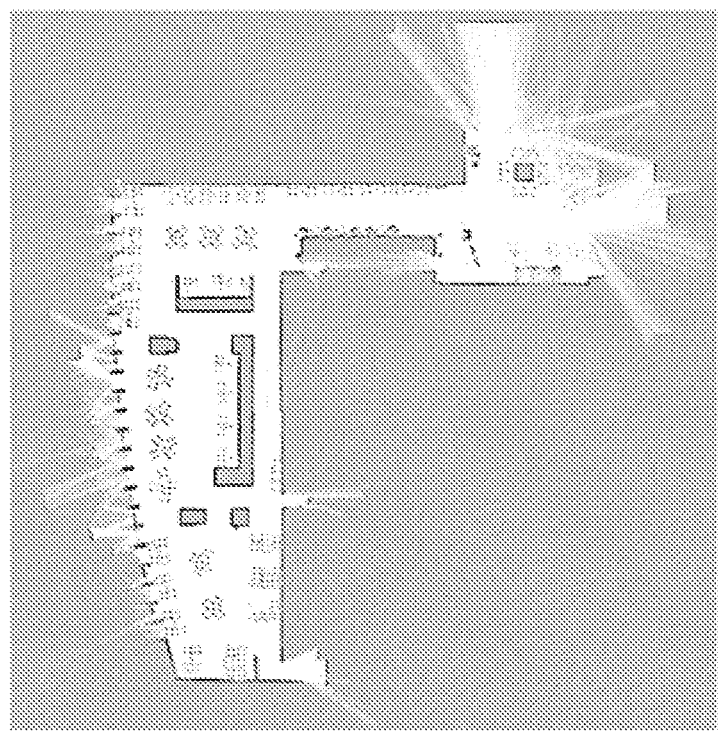
FIG. 3A illustratively shows a raw map according to one embodiment of the invention.
Figure 3B:
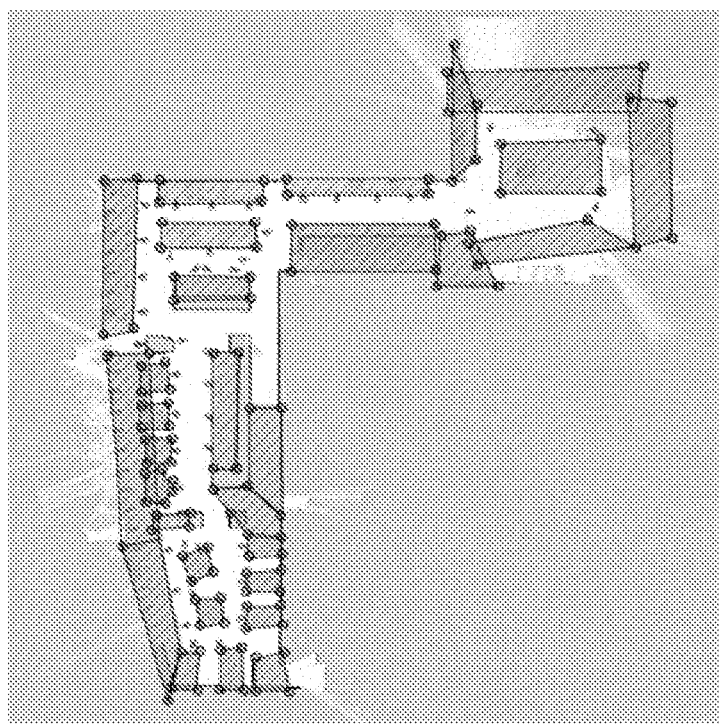
FIG. 3B illustratively shows a manually edited map according to the prior art.

FIG. 3A illustratively shows a raw map according to one embodiment of the invention. FIG. 3B illustratively shows a manually edited map according to the prior art.

Figure 4:
FIG. 4 illustratively shows a map for a robot generated according to one embodiment of the invention.
Figure 5:
FIG. 5 illustratively shows a map for a robot generated according to one embodiment of the invention.
Figure 6:
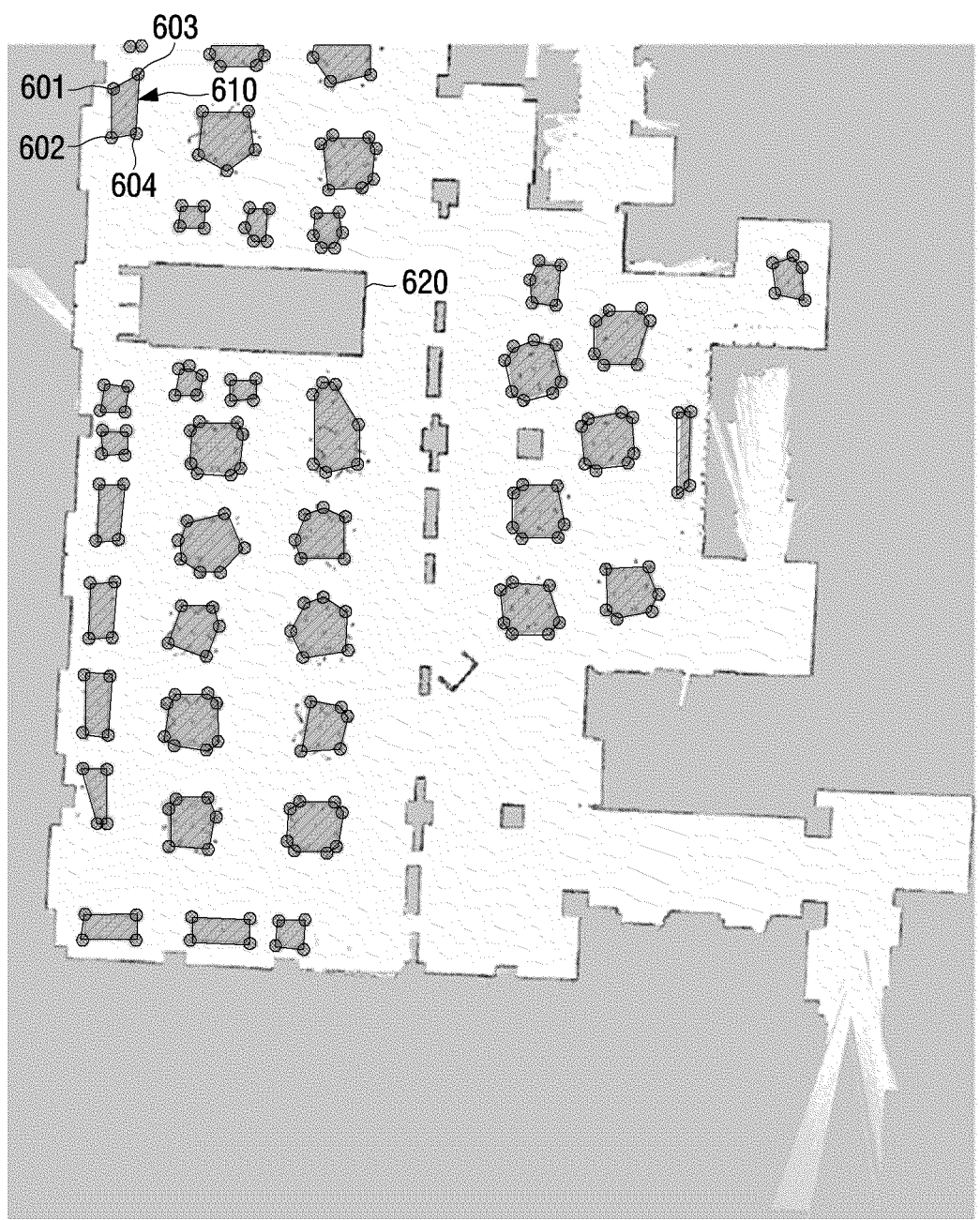
FIG. 6 illustratively shows a map for a robot generated according to one embodiment of the invention.

FIGS. 4 to 6 illustratively show maps for a robot generated according to one embodiment of the invention.

Referring to FIGS. 3A to 4, a raw map around a place where the robot 300 is located is acquired according to one embodiment of the invention (see FIG. 3A). According to the prior art, there are limitations in terms of speed and accuracy because the raw map is used as it is or noises should be manually removed and contours of obstacles should be corrected with the naked eye (see FIG. 3B). However, the map management system 200 according to the invention may perform such noise removal and contour correction quickly, accurately, and minutely (see FIG. 4).

First, a raw map associated with a task of the robot 300 may be acquired according to one embodiment of the invention.

Next, according to one embodiment of the invention, pixels estimated to be noises may be identified in the raw map on the basis of at least one of colors of pixels specified in the raw map and sizes of areas associated with the pixels, and the pixels estimated to be the noises may be removed from the raw map.

Next, referring to FIGS. 4 to 6, according to one embodiment of the invention, pixels estimated to be fixed obstacles 420, 520, and 620 may be identified on the basis of at least one of colors of pixels specified in the raw map from which the pixels estimated to be the noises are removed, and sizes of areas associated with the pixels, and at least one of colors and thicknesses of contour pixels of the fixed obstacles 420, 520, and 620 estimated as above may be corrected.

Next, according to one embodiment of the invention, pixels estimated to be moving obstacles may be identified on the basis of at least one of colors of pixels specified in the raw map where the contour pixels of the fixed obstacles 420, 520 and 620 are corrected, and sizes of areas associated with the pixels, and dilation and erosion operations on the pixels estimated to be the moving obstacles may be performed to determine contours 410, 510, and 610 of the moving obstacles on the basis of polygons 401, 402, 403, 404, 405, 406, 501, 502, 503, 504, 505, 506, 507, 508, 601, 602, 603, and 604.

Next, according to one embodiment of the invention, at least one of the contours 410, 510, and 610 of the moving obstacles and coordinate data on the contours 410, 510, and 610 (e.g., coordinate data in a reference coordinate system associated with the raw map, a reference coordinate system of the robot 300, or an absolute coordinate system) may be generated as annotation information of the raw map.

Next, according to one embodiment of the invention, the robot 300 may perform the task on the basis of the corrected raw map and the annotation information of the raw map.

Meanwhile, when the contours 410, 510, and 610 of the moving obstacles need to be corrected afterwards, they may be easily adjusted on the basis of the polygons 401, 402, 403, 404, 405, 406, 501, 502, 503, 504, 505, 506, 507, 508, 601, 602, 603, and 604.

Meanwhile, various computer programs or tools such as OpenCV library functions of the Python programming language may be utilized to generate a map for a robot according to the invention. For example, functions such as threshold( ), connectedcomponentswithstats( ), canny( ), houghlinesp( ), erode( ), dilate( ), findcontours( ), convexhull( ), and approxpolydp( ) of the Python programming language may be used.

Further, although the embodiments in which noise removal, contour correction for fixed obstacles, and contour determination for moving obstacles are performed in that order have been mainly described above, the present invention is not necessarily limited to the above order, and the order may be changed to any other order as long as the objects of the invention may be achieved.

Configuration of the Robot

The robot 300 according to one embodiment of the invention may be a robot performing tasks similar to those performed by at least one of a guide robot, a serving robot, a transport robot, a cleaning robot, a medical robot, an entertainment robot, a pet robot, and an unmanned flying robot, and may be implemented in various forms corresponding to the respective tasks.

Figure 7:
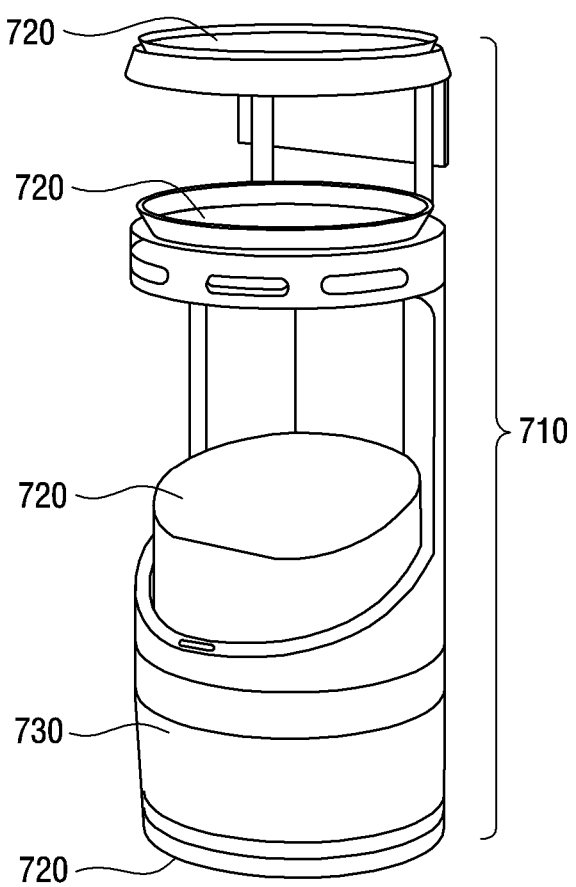
FIG. 7 illustratively shows the structure of a robot according to one embodiment of the invention.

Referring to FIG. 7, the robot 300 may comprise a main body 710, a drive unit 720, and a processor 730.

For example, the main body 710 according to one embodiment of the invention may include at least one loading space for loading an object to be transported or retrieved. The transported or retrieved object according to one embodiment of the invention may refer to all material objects that can be moved, and may encompass things, animals, and people, for example. For example, the transported object may be food and the retrieved object may be a container containing the food.

Figure 8:
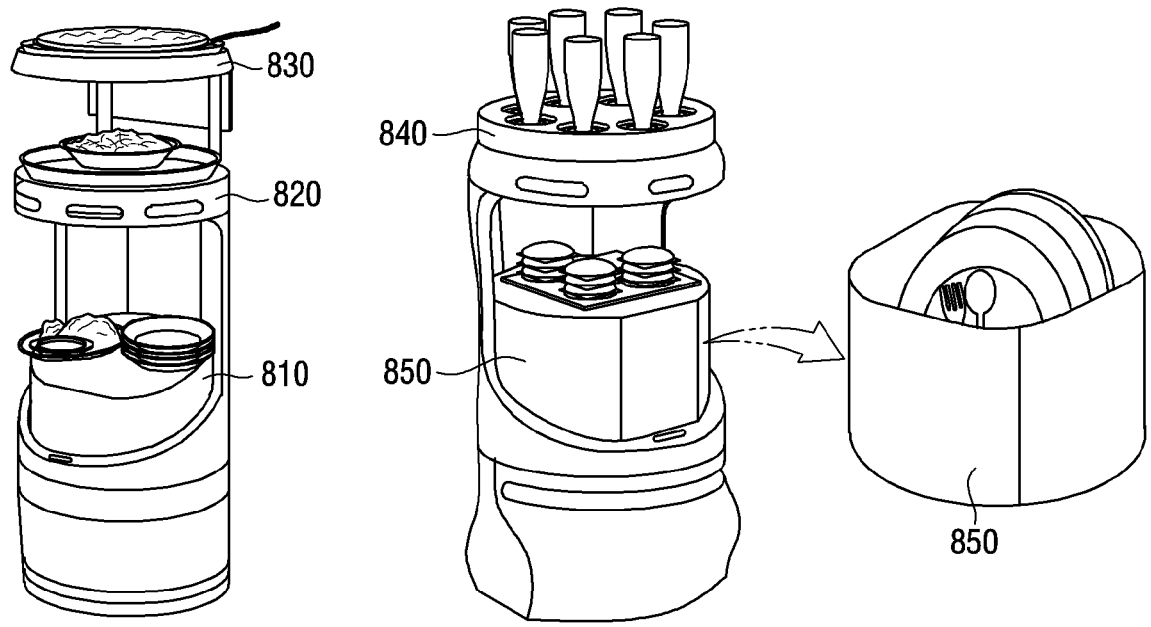
FIG. 8 illustratively shows the structure of a robot according to one embodiment of the invention.

Referring to FIG. 8, when the robot 300 is a serving robot, it may include a first space 810 and a second space 820 for providing the transported object and collecting the retrieved object. Further, the robot 300 may further include a third space 830 that is an expansion space provided via a removable pillar, and more loading spaces may be provided by adding more expansion spaces as needed. Further, the robot 300 may further include a tray 840 dedicated for the transported or retrieved object. For example, the tray 840 may be configured such that a plurality of circular grooves are formed on its top side as seen from the top. Each of the circular grooves may be formed such that the lower part of a cup containing a drink is seated and easily fixed to some extent. The sizes of the circular grooves may be diverse. Further, the lower part of the first space 810 of the robot 300 may include a fourth space 850 that may be taken out through a lateral side of the robot 300. The fourth space 850 according to one embodiment of the invention may have a shape similar to a basket, such that an empty space is formed therein; a lateral side thereof is closed; a top side thereof is open; and a bottom side thereof is closed. However, the loading spaces of the robot 300 according to the invention are not necessarily limited to the above description, and may be diversely implemented as other types of loading spaces as long as the objects of the invention may be achieved.

Meanwhile, referring back to FIG. 7, the main body 710 may further include an imaging module (e.g., a visible light camera, an infrared camera, etc.) (not shown) and a scanner module (e.g., a LIDAR sensor) for acquiring images of surroundings and information on obstacles.

Next, the drive unit 720 according to one embodiment of the invention may comprise a module for moving the main body 710 to other locations or a module for loading and unloading the transported and retrieved objects.

For example, the drive unit 720 may include a module related to electrically, mechanically, or hydraulically driven wheels, propellers, or the like as the module for moving the main body 710 to other locations, and may include a robotic arm module for mounting and conveying the transported and retrieved objects as the module for loading and unloading the transported and retrieved objects.

Next, the processor 730 according to one embodiment of the invention may be electrically connected to the drive unit 720 to perform a function of controlling the drive unit 720 (and may include a communication module for communicating with an external system). For example, the processor 730 may be a data processing device that are embedded in hardware and have circuits physically structured to perform codes included in a program or functions represented by instructions. For example, such a data processing device embedded in hardware may include a processing device such as a microprocessor, a central processing unit, a processor core, a multiprocessor, an application-specific integrated circuit (ASIC), and a field programmable gate array (FPGA).

Further, the processor 730 may perform the functions of at least one of the raw map acquisition unit 210, the pixel identification unit 220, the contour determination unit 230, the noise removal unit 240, and the contour correction unit 250 of the map management system 200 according to the invention (e.g., the corresponding functions may be modularized and included in the processor 730), and may function to control the drive unit 720 through communication with an external system (not shown) that performs the functions of at least one of the raw map acquisition unit 210, the pixel identification unit 220, the contour determination unit 230, the noise removal unit 240, and the contour correction unit 250.

Specifically, the processor 730 may function to: acquire a raw map associated with a task of the robot 300; identify pixels estimated to be a moving obstacle in the raw map, on the basis of at least one of colors of pixels specified in the raw map and sizes of areas associated with the pixels; and perform dilation and erosion operations on the pixels estimated to be the moving obstacle, and determine a polygon-based contour of the moving obstacle.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for generating a map for a robot, the method comprising the steps of:
   acquiring a raw map associated with a task of the robot by generating the raw map on the basis of sensing information acquired by sensing at least one object disposed outside the robot;
   identifying pixels estimated to be a moving obstacle, pixels estimated to be noises, and pixels estimated to be a fixed obstacle in the raw map, on the basis of colors of pixels specified in the raw map and sizes of areas associated with the pixels;
   performing dilation and erosion operations on the pixels estimated to be the moving obstacle, and determining a polygon-based contour of the moving obstacle; and
   generating annotation information of the raw map on the basis of at least one of the contour of the moving obstacle and coordinate data on the contour,
   wherein the robot is configured to perform the task on the basis of the raw map and the annotation information of the raw map, wherein the colors of pixels specified in the raw map are represented in a gray scale according to the sensing information, such that white pixels are associated with an area where nothing is located, black pixels are associated with an area where a real world object is located, and gray pixels are associated with an area where there is a possibility of a real world object being located, and wherein in the identifying step, pixels in an area that is formed by connecting the gray pixels and black pixels adjacent to each other and has a size not greater than a first threshold size are identified as the pixels estimated to be the noises, pixels in an area that is formed by connecting the black pixels adjacent to each other and has a size greater than the first threshold size and not greater than a second threshold size are identified as the pixels estimated to be the moving obstacle, and pixels in an area that is formed by connecting the black pixels adjacent to each other and has a size greater than the second threshold size are identified as the pixels estimated to be the fixed obstacle.

2. The method of claim 1, further comprising the step of removing the pixels estimated to be the noises from the raw map.

3. The method of claim 1, further comprising the step of correcting at least one of a color and a thickness of a contour of the pixels estimated to be the fixed obstacle in the raw map.

4. The method of claim 3, wherein in the correcting step, the pixels estimated to be the moving obstacle are suppressed for the correction.

5. The method of claim 1, wherein in the determining step, the dilation and erosion operations are sequentially performed on the pixels estimated to be the moving obstacle.

6. The method of claim 1, wherein in the determining step, the contour of the moving obstacle is determined by grouping at least one other moving obstacle located within a predetermined distance from the moving obstacle together with the moving obstacle, and determining contours of the grouped moving obstacles.

7. The method of claim 1, wherein in the determining step, a convex hull associated with the moving obstacle is identified on the basis of a convex hull algorithm, and the contour of the moving obstacle is determined on the basis of the identified convex hull.

8. A non-transitory computer-readable recording medium having stored thereon a computer program for executing a method for generating a map for a robot, the method comprising the steps of:
  acquiring a raw map associated with a task of the robot by generating the raw map on the basis of sensing information acquired by sensing at least one object disposed outside the robot;
  identifying pixels estimated to be a moving obstacle, pixels estimated to be noises, and pixels estimated to be a fixed obstacle in the raw map, on the basis of colors of pixels specified in the raw map and sizes of areas associated with the pixels;
  performing dilation and erosion operations on the pixels estimated to be the moving obstacle, and determining a polygon-based contour of the moving obstacle; and
  generating annotation information of the raw map on the basis of at least one of the contour of the moving obstacle and coordinate data on the contour,
  wherein the robot is configured to perform the task on the basis of the raw map and the annotation information of the raw map,
  wherein the colors of pixels specified in the raw map are represented in a gray scale according to the sensing information, such that white pixels are associated with an area where nothing is located, black pixels are associated with an area where a real world object is located, and gray pixels are associated with an area where there is a possibility of a real world object being located, and
  wherein in the identifying step, pixels in an area that is formed by connecting the gray pixels and black pixels adjacent to each other and has a size not greater than a first threshold size are identified as the pixels estimated to be the noises, pixels in an area that is formed by connecting the black pixels adjacent to each other and has a size greater than the first threshold size and not greater than a second threshold size are identified as the pixels estimated to be the moving obstacle, and pixels in an area that is formed by connecting the black pixels adjacent to each other and has a size greater than the second threshold size are identified as the pixels estimated to be the fixed obstacle.

9. A system for generating a map for a robot, the system comprising:
  a raw map acquisition unit configured to acquire a raw map associated with a task of the robot by generating the raw map on the basis of sensing information acquired by sensing at least one object disposed outside the robot;
  a pixel identification unit configured to identify pixels estimated to be a moving obstacle pixels estimated to be noises, and pixels estimated to be a fixed obstacle in the raw map, on the basis of colors of pixels specified in the raw map and sizes of areas associated with the pixels; and
  a contour determination unit configured to perform dilation and erosion operations on the pixels estimated to be the moving obstacle, determine a polygon-based contour of the moving obstacle, and generate annotation information of the raw map on the basis of at least one of the contour of the moving obstacle and coordinate data on the contour,
  wherein the robot is configured to perform the task on the basis of the raw map and the annotation information of the raw map,
  wherein the colors of pixels specified in the raw map are represented in a gray scale according to the sensing information, such that white pixels are associated with an area where nothing is located, black pixels are associated with an area where a real world object is located, and gray pixels are associated with an area where there is a possibility of a real world object being located, and
  wherein the pixel identification unit is configured to identify pixels in an area that is formed by connecting the gray pixels and black pixels adjacent to each other and has a size not greater than a first threshold size as the pixels estimated to be the noises, to identify pixels in an area that is formed by connecting the black pixels adjacent to each other and has a size greater than the first threshold size and not greater than a second threshold size as the pixels estimated to be the moving obstacle, and to identify pixels in an area that is formed by connecting the black pixels adjacent to each other and has a size greater than the second threshold size as the pixels estimated to be the fixed obstacle.

10. The system of claim 9, further comprising a noise removal unit configured to remove the pixels estimated to be the noises from the raw map.

11. The system of claim 9, further comprising a contour correction unit configured to correct at least one of a color and a thickness of a contour of the pixels estimated to be the fixed obstacle in the raw map.

12. The system of claim 11, wherein the contour correction unit is configured to suppress the pixels estimated to be the moving obstacle for the correction.

13. The system of claim 9, wherein the contour determination unit is configured to sequentially perform the dilation and erosion operations on the pixels estimated to be the moving obstacle.

14. The system of claim 9, wherein the contour determination unit is configured to determine the contour of the moving obstacle by grouping at least one other moving obstacle located within a predetermined distance from the moving obstacle together with the moving obstacle, and determining contours of the grouped moving obstacles.

15. The system of claim 9, wherein the contour determination unit is configured to identify a convex hull associated with the moving obstacle on the basis of a convex hull algorithm, and determine the contour of the moving obstacle on the basis of the identified convex hull.

* * * * *